(12) United States Patent
Vilnrotter et al.

(10) Patent No.: US 7,058,316 B2
(45) Date of Patent: Jun. 6, 2006

(54) ADAPTIVE DETECTOR ARRAYS FOR OPTICAL COMMUNICATIONS RECEIVERS

(75) Inventors: Victor Vilnrotter, Pasadena, CA (US); Meera Srinivasan, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 664 days.

(21) Appl. No.: 09/996,233

(22) Filed: Nov. 28, 2001

(65) Prior Publication Data

US 2002/0126361 A1 Sep. 12, 2002

Related U.S. Application Data

(60) Provisional application No. 60/253,610, filed on Nov. 28, 2000.

(51) Int. Cl.
*H04B 10/06* (2006.01)
*H04B 10/08* (2006.01)

(52) U.S. Cl. .................................... 398/202; 398/26
(58) Field of Classification Search .............. 398/26, 398/202–214
See application file for complete search history.

(56) References Cited

U.S. PATENT DOCUMENTS

| | | | | |
|---|---|---|---|---|
| 3,740,560 A | * | 6/1973 | Wentz | 398/201 |
| 4,309,602 A | * | 1/1982 | Gonsalves et al. | 250/201.9 |
| 4,490,039 A | * | 12/1984 | Bruckler et al. | 356/121 |
| 5,099,114 A | * | 3/1992 | Matsumoto et al. | 250/227.23 |
| 5,552,916 A | * | 9/1996 | O'Callaghan et al. | 349/201 |
| 5,640,419 A | * | 6/1997 | Janusas | 375/239 |
| 5,867,290 A | * | 2/1999 | Dutt et al. | 398/43 |
| 5,896,211 A | * | 4/1999 | Watanabe | 398/76 |
| 6,091,523 A | * | 7/2000 | Brandstetter | 398/39 |
| 6,097,732 A | * | 8/2000 | Jung | 370/466 |
| 6,115,113 A | * | 9/2000 | Flockencier | 356/5.01 |
| 6,404,760 B1 | * | 6/2002 | Holtzman et al. | 370/342 |
| 6,864,916 B1 | * | 3/2005 | Nayar et al. | 348/224.1 |
| 2004/0012544 A1 | * | 1/2004 | Swaminathan et al. | 345/32 |

OTHER PUBLICATIONS

Vilnrotter, Victor A. "Optical Receivers Using Rough Reflectors". May 1, 1985. JPL Publication 85-25. NASA.*
Papoulis, A. "Probability, Random Variables and Stochastic Processes" New York, McGraw-Hill, 1965 (pp. 83-115).
Hoversten, E.V., et al. "Communication Theory for the Turbulent Atmosphere" Proceedings of the IEEE, pp. 1626-1650, Oct. 1970 (26 pages).
Hubbard, W.M. "Binary Detection in an Optical Twin Channel Receiver", IEEE Transactions on Communication Technology, vol. 19, pp. 221-223, Apr. 1971 (4 pages).

(Continued)

*Primary Examiner*—Jason Chan
*Assistant Examiner*—David Lee
(74) *Attorney, Agent, or Firm*—Christie, Parker & Hale, LLP

(57) ABSTRACT

An optical communications receiver comprising a wideband optical detector array and a high-speed digital signal processor programmed to operate on the raw data from the detector array to ameliorate the effects of atmospheric turbulence on the performance of the optical receiver in real-time while operating within the terrestrial atmosphere, or while attempting to communicate through any similar turbulent medium is provided. A method of sending optical communications through such optical communications receivers is also provided.

17 Claims, 16 Drawing Sheets

OTHER PUBLICATIONS

Snyder, D.L. "Random Poinat Processes" New York: John Wiley & Sons, 1975 (13 pages).

Gagliardi, R.M. and Karp, S. "Optical Communications" New York: John Wiley & Sons, 1976 (pp. 77-106).

Vilnrotter, V.A. "Optical Receivers Using Rough Reflectors" JPL Publication 85-25, Jet Propulsion Laboratory, Pasadena, California, May 1, 1985 (46 pages).

Negrete-Regagnon, P. "Practical Aspects of Image Recovery by Means of the Bispectrum", Journal of the Optical Society of America, vol. 13, No. 7, pp. 1557-1576, Jul. 1996 (20 pages).

Andrews, Larry C. and Phillips, Ronald L. "Laser Beam Propagation Through Random Media", Bellingham Washington: SPIE Optical Engineering Press, 1998 (pp. 1-5).

Victor A. Vilnrotter, "Detection of Scattered Optical Fields with Focal Plane Ring Detectors", International Telemetering Conference, Los Angeles, 1977, vol. XIII, pp. 161-171.

* cited by examiner

Kb = 0.1

Kb = 1.0

US 7,058,316 B2

ADAPTIVE DETECTOR ARRAYS FOR OPTICAL COMMUNICATIONS RECEIVERS

CROSS-REFERENCE TO RELATED APPLICATION(S)

This application claims the benefit of U.S. provisional application No. 60/253,610 filed on Nov. 28, 2000, the content of which is incorporated herein by reference.

STATEMENT REGARDING FEDERALLY SPONSORED RESEARCH OR DEVELOPMENT

The U.S. Government has certain rights in this invention pursuant to grant No. NAS7-1407, awarded by the National Aeronautical and Space Administration.

FIELD OF THE INVENTION

This invention is directed to improved optical receivers, and particularly to high data-rate optical receivers utilizing wide-band optical detector arrays capable of correcting for signal degradation caused by atmospheric turbulence.

BACKGROUND OF THE INVENTION

It is well known that ground-based reception of optical signals suffers from degradation of the optical phase-front caused by atmospheric turbulence. This turbulence leads to a reduction in the effective diameter of the receiving telescope, and to random fluctuations of the receiver's "point spread function" (PSF) in the focal plane.

For example, the diffraction-limited field of view (FOV) of a receiving telescope can be taken to be approximately $\theta_{dl} \cong \lambda/D_R$, which, for a 3-m aperture and 1 μm wavelength, translates to 0.33 μrad. If the effective focal length of the telescope is 6 m (implying an F/2 instrument), then a diffraction-limited PSF of 2 μm diameter, or 0.002 mm, will be produced in the focal plane. Thus, under ideal conditions a very small detector could be used to collect virtually all of the signal energy, while at the same time spatially filtering out most of the background radiation.

However, atmospheric conditions rarely permit diffraction-limited operation of large telescopes; even under "good" nighttime seeing conditions, the phase of the received signal field tends to become uncorrelated over distances greater than 20 cm, deteriorating to as little as 2 to 4 cm during the day. Under these conditions, the dimensions of the PSF in the focal-plane tends to increase inversely with coherence length, as if the diffraction-limited telescope were correspondingly reduced; the telescope still collects all of the signal energy propagating through its physical aperture, but the collected signal energy is redistributed into a much larger spot in the focal plane. In conventional receivers, the receiver's FOV is increased proportionally to collect the signal. However, this increase in the receiver's FOV leads to a corresponding increase in the amount of interfering background radiation offsetting much of the performance gain.

Some attempts have been made to utilize signal-processing hardware to reduce the deleterious effects of atmospheric turbulence on receiver performance. However, due to the limitations of the chosen algorithms and the electronics utilized, only the average PSF of the received signals over a relatively long time period have been successfully processed. Although some performance improvement has been seen from receivers utilizing these time-average PSF signal-processing techniques, because the PSF can change on the order of milliseconds much of the detailed information from the processed transmissions is lost.

Accordingly, there is a need for an optical communications receiver capable of correcting the signal degradation from atmospheric turbulence instantaneously and without significantly increasing interference from background radiation.

SUMMARY OF THE INVENTION

The present invention is directed to an optical communications receiver comprising a wide-band optical detector array and a high-speed digital signal processor assembly programmed to operate on the raw data from the detector array in real-time to ameliorate the effects of atmospheric turbulence on the performance of the optical receiver while operating within the terrestrial atmosphere, or while attempting to communicate through any similar turbulent medium.

In one embodiment, the detector array is designed for communications applications such that the signal processing assembly processes an array of parallel outputs, one from each detector element, instead of the usual serial row or column readouts typical in imaging applications. In such an embodiment, each detector element preferably has a bandwidth commensurate with the data requirements. Any parallel output detector array may be utilized in such an embodiment, such as, for example, an array of photomultiplier tubes (PMTs) capable of counting individual photons or an array of "avalanche photodiode" (APD) detectors with individually accessible outputs.

In one embodiment, the signal processing assembly samples each output from the detector array at the Nyquist rate, and uses these samples to measure the average signal and background noise energies over each detector element. In such an embodiment, since the coherence time for the turbulence-degraded fields is on the order of several milliseconds, the integration time for this measurement can last up to a millisecond or more, during which time a great many data-symbols are received.

In the above embodiments, several possible algorithms can be applied via the signal processing assembly to combine the detector outputs advantageously, i.e., to maximize the probability of correct detection. For example, in one embodiment, a logarithmic function of the ratio of signal and noise energies is applied to each output for a short time corresponding to the coherence-time of the channel. In an alternative embodiment, a time-varying "mask" is computed and applied to the array such that only those elements of the array with the greatest signal content are utilized.

In still yet another embodiment, the invention is directed to a method of ameliorating the effects of atmospheric turbulence on the performance an optical receiver utilizing the detector array and signal processing assembly described herein.

BRIEF DESCRIPTION OF DRAWINGS

These and other features and advantages of the present invention will be better understood by reference to the following detailed description when considered in conjunction with the accompanying drawings wherein:

FIG. 11 is a graphical representation of the performance of three different signal-to-noise ratio measures considered in an optical receiver according to the present invention with;

DETAILED DESCRIPTION OF THE INVENTION

The present invention is directed to an optical communications receiver comprising a wide-band optical detector array and a high-speed digital signal processor assembly programmed to operate on the raw data from the detector array to ameliorate the effects of atmospheric turbulence on the performance of the optical receiver in real-time while operating within the terrestrial atmosphere, or while attempting to communicate through any similar turbulent medium.

Figure 1A:
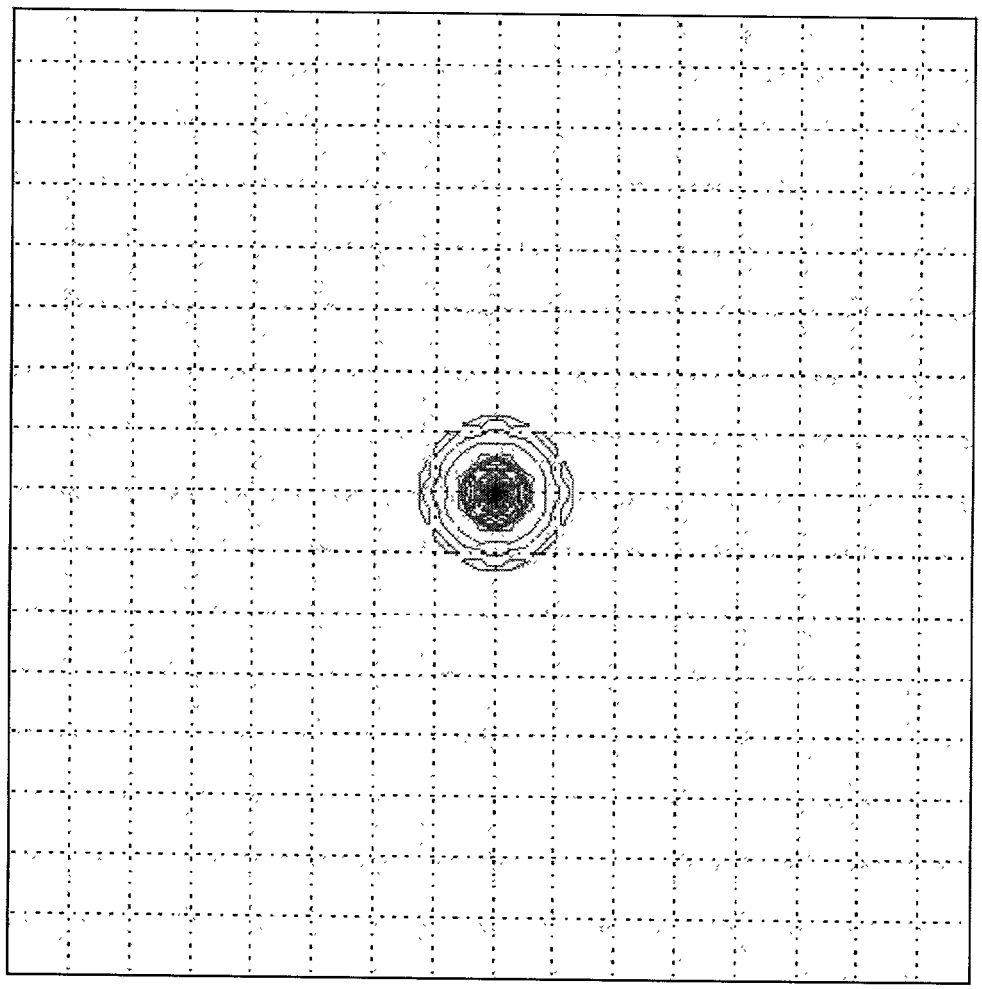
FIG. 1a is a representation of a receiver's point spread function under ideal conditions.
Figure 1B:
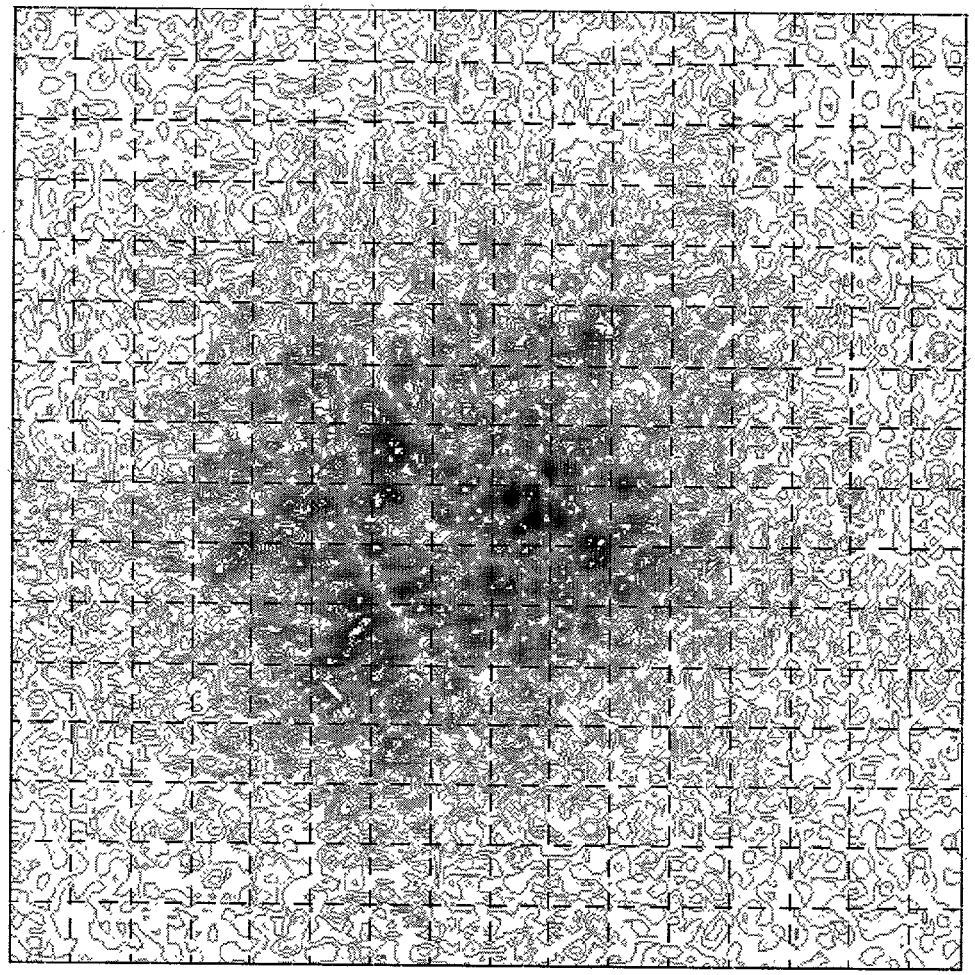
FIG. 1b is a representation of a receiver's point spread function under atmospheric turbulence conditions.

An example of the increase in the effective dimensions of an exemplary receiver point-spread function over its diffraction-limited value as a result of atmospheric turbulence is shown by comparison in FIGS. 1a and 1b. The hypothetical signal shown in these figures correspond to a telescope having a 1 m aperture, an 0.3 m central obstruction, and a 4 cm atmospheric coherence. As shown in FIG. 1a, under ideal conditions the undistorted signal generates a diffraction limited point spread function (PSF) in the detector array. However, as shown in FIG. 1b, under the influences of atmospheric turbulence, the point-spread function is degraded and enlarged.

Under such conditions, in order to collect all of the signal energy, the dimensions of a single optical detector must be made large enough to encompass the degraded point-spread function as well as its random excursions in the focal plane, which tend to change on time scale of 10 to 100 ms. Thus, the active area of the detector must be made large enough to encompass most of the signal energy most of the time. However, a large detector implies a large receiver field of view, which in turn implies a corresponding increase in the amount of background radiation admitted into the receiver. That, in turn, degrades communication performance.

Although in the above example a telescope of 1 m diameter with a secondary obstruction of 0.3 m has been assumed, it should be understood that similar results hold for larger telescope diameters as well as long as the focal-plane signal distribution is dominated by turbulence effects. Since the diffraction-limited PSF is inversely proportional to the telescope diameter, this condition generally will be satisfied for larger telescope diameters; however, the background and signal energies must be properly scaled to account for the larger collecting area. If the receiver optics are not diffraction limited but have significant imperfections, generating a PSF with dimension that are comparable to the turbulence-induce distribution, then more detailed modeling of the signal distribution becomes necessary.

Figure 2:
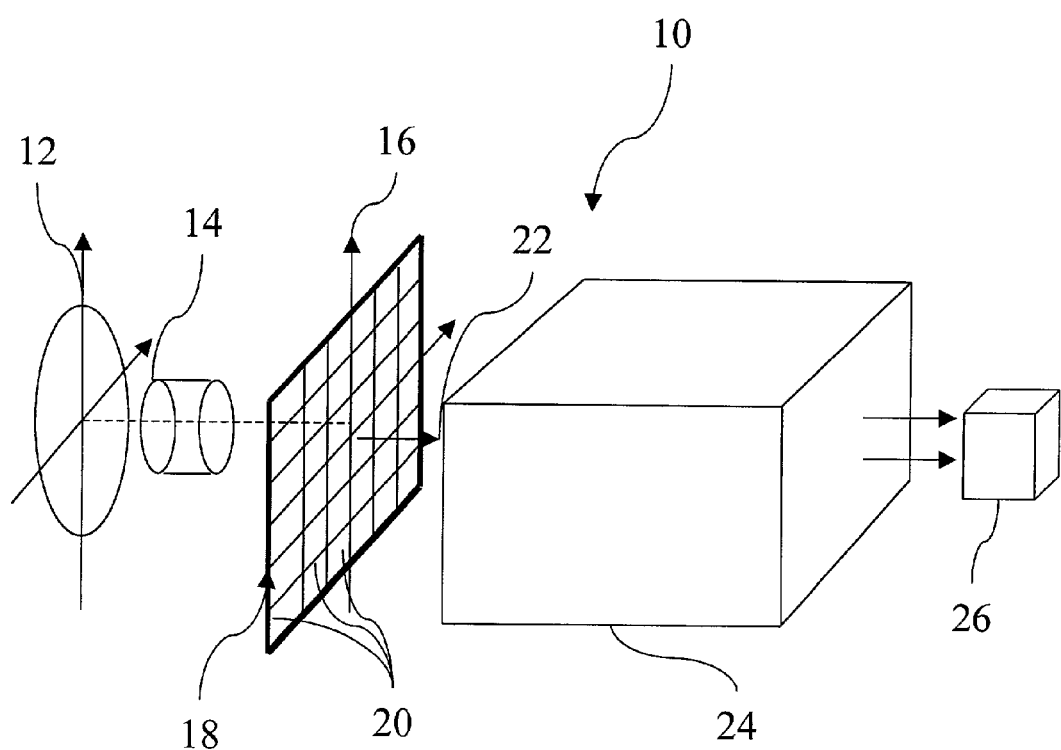
FIG. 2 is a schematic of an optical receiver according to the present invention.

A conceptual block diagram of an optical photon-counting array receiver according to the present invention is shown in FIG. 2. The receiver 10 consists of a collecting aperture 12 and optics 14 to focus the collected fields onto the focal plane 16 of a detector array 18 comprising a plurality of detector elements 20, such as individual photomultiplier tubes or avalanche photodiode detectors, which respond to the impinging fields. The individual output voltage 22 from every detector element 20 of the array 18 are converted to numeric samples, which then are operated on by a signal-processing assembly 24 that performs the required signal processing algorithms in order to optimize the receiver performance in real-time.

In the above embodiments, any collecting aperture 12 capable of collecting optical signals from an external source and transmitting those collected signals to the receiver optics 12 may be utilized in the current invention. For example, 10 cm telescopes for terrestrial repeaters, 5 to 10 m communication apertures, or 1 m aperture optical communication telescope laboratory (OCTL) receivers.

Likewise, any optics package 14 suitable for focusing the collected fields onto the focal plane 16 of the detector array 18 may be utilized in the current invention.

Although the above embodiment only describes the use of photomultiplier and avalanche photodiode detector elements 20, any suitable optical detector may be utilized in the current invention. For example, even PIN diode arrays could be utilized when adequate signal energy is available.

The signal processing assembly 24 of the current invention may comprise any electronic components suitable to allow signal analysis to occur at sufficiently high-speed to allow instantaneous or real-time analysis of the PSF, i.e., which allows signal processing of each detector element output at the Nyquist rate not at a signal averaged rate. For example, high-speed digital signal processors (DSPs), FPGAs, or dedicated ASIC designs could be utilized.

The signal-processing assembly 24 optimizes the receiver performance by selecting which elements 20 of the detector array 18 should be used to collect data at any arbitrary instantaneous point of time. Data from detector elements 20 with signal content sufficiently over the background signal level to improve the signal statistics are then combined and data from elements 20 with signal levels at or near the background signal level are rejected and the result is output by the signal-processor assembly 24 to a decoder 26 which detects the incoming signal at that arbitrary time point from the signal-processor assembly output.

Figure 3:
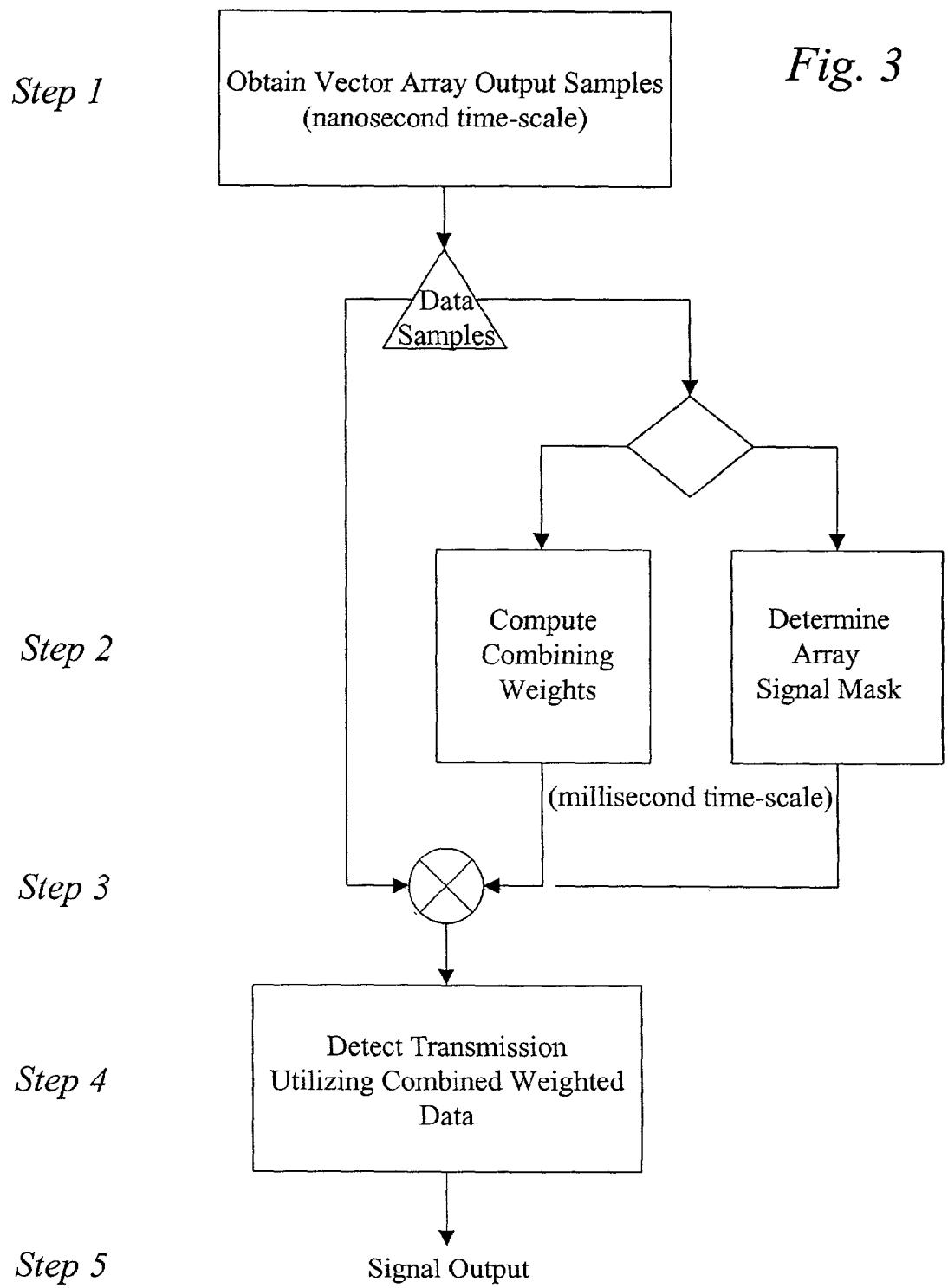
FIG. 3 is a flowchart of an embodiment of a signal processing method utilized in the optical receiver according to the present invention.

FIG. 3 depicts a flow-chart of an embodiment of the process utilized by an exemplary signal-processor assembly 24 according to the current invention to optimize the receiver performance. During operation, the signal-processor assembly 24 first obtains a vector array of data outputs from the detector array 18 at Step 1 and then at Step 2 operates to sample the data to measure the background and signal noise energies and then compute an estimate of the signal intensity and a data weighting parameter for each output based on one of several possible processing algorithms to increase the probability of correct signal detection. At Step 3, the detector outputs are multiplied by their corresponding calculated data weighting parameter and outputs the weighted data. At Step 4 the combined weighted data is utilized to detect the transmitted signal and the signal is output to the user at Step 5.

Any data weighting algorithm and parameter may be utilized to optimize the signal received by the processor 24 from the detector array 18, such as, for example, applying a logarithmic function of the ratio of signal and noise energies to each output for a short time corresponding to the coherence-time of the channel, or alternatively, computing and applying a time-varying "mask" to the array that effectively uses only those elements of the array with the greatest signal content. These exemplary algorithms and the signal-processing method utilized in the current invention, and schematically shown in FIG. 3 are described in greater detail below.

In a conventional single-detector element receiver, the receiver measures the number of photons contained in a received field by producing a stream of free electrons at its output terminal in response to the absorbed photons. If the occurrence time of each pulse can be measured, and if the amplitude of each pulse is normalized to unity, then the count record consists of positive integer-valued jumps occurring each time a photon is detected. Therefore, the count record or count accumulator function is a monotonically increasing function that contains all of the information present in the detection process and the conditional density of the total number of counts, N, given an intensity function $\lambda(t)$, can be expressed as:

$$p[N(t)|\lambda(t); 0 \leq t < T] = \exp\left(-\int_0^T \lambda(t)dt\right) \quad (1a)$$

where N(T)=0, and $$p[N(t)|\lambda(t); 0 \leq t < T] = \left[\prod_{i=0}^{N} \lambda(w_i)\right] \exp\left(-\int_0^T \lambda(t)dt\right) \quad (1b)$$

where $N(T) \geq 1$. Where the set $\{w_i\}$ represents the occurrence times of the detected pulses; N(t) is called the count accumulator function of the process over the time interval (0,T); and $\lambda(t) = \int\int_A dxdy\lambda(x,y;t)$, where A is the detector area and $\lambda(x,y;t)$ is the intensity process over space and time.

However, this expression only describes the output of a single detector element responding to an optical intensity. When an array of detectors is used to detect the optical field, Equations 1a and 1b must be generalized to enable an unambiguous description of the output of each detector element 20.

Consider a rectangular array of detector elements 18 of K×L detector elements 20, as shown in FIG. 2. For some applications, such as finding the center of the signal intensity distribution, it is important to know the location of each detector element within the array. In such an embodiment, the subscripts mn, where $1 \leq m \leq K$ and $1 \leq n \leq L$ to denote the position of the detector element within the array. Thus, the sample function density defined in Equation 1 can be written as:

$$p[N_{mn}(t)|\lambda_{mn}(t); 0 \leq t \leq T] \quad (2)$$

which now represents the output of a particular element of the array. Note in such an embodiment, $\lambda_{mn}(t)$ can be viewed as that portion of a spatially distributed intensity function intercepted by the mnth detector element according to:

$$\lambda_{mn}(t) = \int_{A_{mn}}\int dxdy\lambda(x, y; t) \quad (3)$$

where $A_{mn}$ is its effective area. Note that if the spatial intensity distribution is known, and the location and size of each detector element also are known, then conditioning on the spatial intensity distribution is equivalent to conditioning on the array of intensity components, each of which is still a function of time. Assuming that each array element observes the sum of a signal field plus multimode Gaussian noise field with average noise count per mode much less than one, the array outputs can be modeled as conditionally independent Poisson processes, conditioned on the average signal intensity over each detector element. Hence, the joint conditional sample function density of the array can be denoted as:

$$p[N(t)|\lambda(t); 0 \leq t \leq T] = \prod_{m=1}^{K}\prod_{n=1}^{L} p[N_{mn}(t)|\lambda_{mn}(t); 0 \leq t < T] \quad (4)$$

where $N(t) \equiv (N_{11}(t), N_{12}(t), \ldots, N_{KL}(t))$ and each component on the right-hand side of Equation 4 is defined in Equation 1.

Accordingly, a signal propagating through the atmosphere and through the receiving optics 12 is transformed into a space-time intensity function in the detector plane. The receiver 10 also collects background energy from all directions, which is assumed to contribute an additional constant intensity, $\lambda_b$, per detector element. The integrated intensity is then given by Equation 3, above plus the additional constant background level.

Once the total intensity is measured by the detector the signal-processor operates on the signal to instantaneously determine the information contained therein. To accomplish this signal processing, in one embodiment, at the end of T sec, the signal processor assembly estimates the signal intensity and then computes the probability of having received the observed array of count accumulator functions and selects that message corresponding to the greatest probability of having been received. The spatial component of the process typically consists of calculating the greatest log-likelihood function, Λ(T), having a spatial portion given by an equation of the form:

$$\Lambda(T) = \sum_{m=1}^{K} \sum_{N=1}^{L} \left\{ \sum_{(observational\ interval)} \ln\left(1 + \frac{\lambda_{s,mn}}{\lambda_b}\right) N_{mn} \right\} \quad (5)$$

where $N_{mn}$ is the total number of photons occurring over the mnth detector element. It should be noted that the log-likelihood function of Equation 5, above, mathematically relates only the spatial portion of the function and that such a function may require an additional modulation dependent term. In addition, the spatial intensity must be estimated often enough to capture any fluctuations in the modulation, but must be averaged over sufficient time to ensure adequate signal statistics (in most cases~msec). Rewriting the logarithmic functions or weights in Equation 5 as $u_{mn}$, allows the log-likelihood function to be rewritten as:

$$\Lambda(T) = \sum_{m=1}^{K} \sum_{N=1}^{L} u_{mn} N_{mn} \quad (6)$$

In this form, it is clear that the log-likelihood function is composed of sums of a random number of weights from each detector element, for example, the mnth detector element contributes an integer number of its own weight to the sum.

According to the preceding analysis, in a receiver system according to this invention, elements of the detector array containing much more background than signal intensity do not contribute significantly to the error probability, since the output of these detector elements is multiplied by weights that are close to zero. Accordingly, in an alternative embodiment of the signal processing assembly 24 the processor first ranks the detector elements, starting with the one containing the most signal energy and followed by every other detector ordered according to decreasing signal intensity. The processor then computes the probability of error for the first detector element plus background; then for the sum of the signal energies from the first two detector elements (plus background for the two detector elements), and so on, until the minimum error probability is reached. In such an embodiment, each set of detectors may be considered to be a single detector, so that no weighting is applied to account for variations in the signal distribution over the detector elements included in that set. The set of detector elements that achieves the minimum probability of error is the best synthesized single detector matched to the signal-intensity distribution and is the one chosen as the signal.

Figure 4:
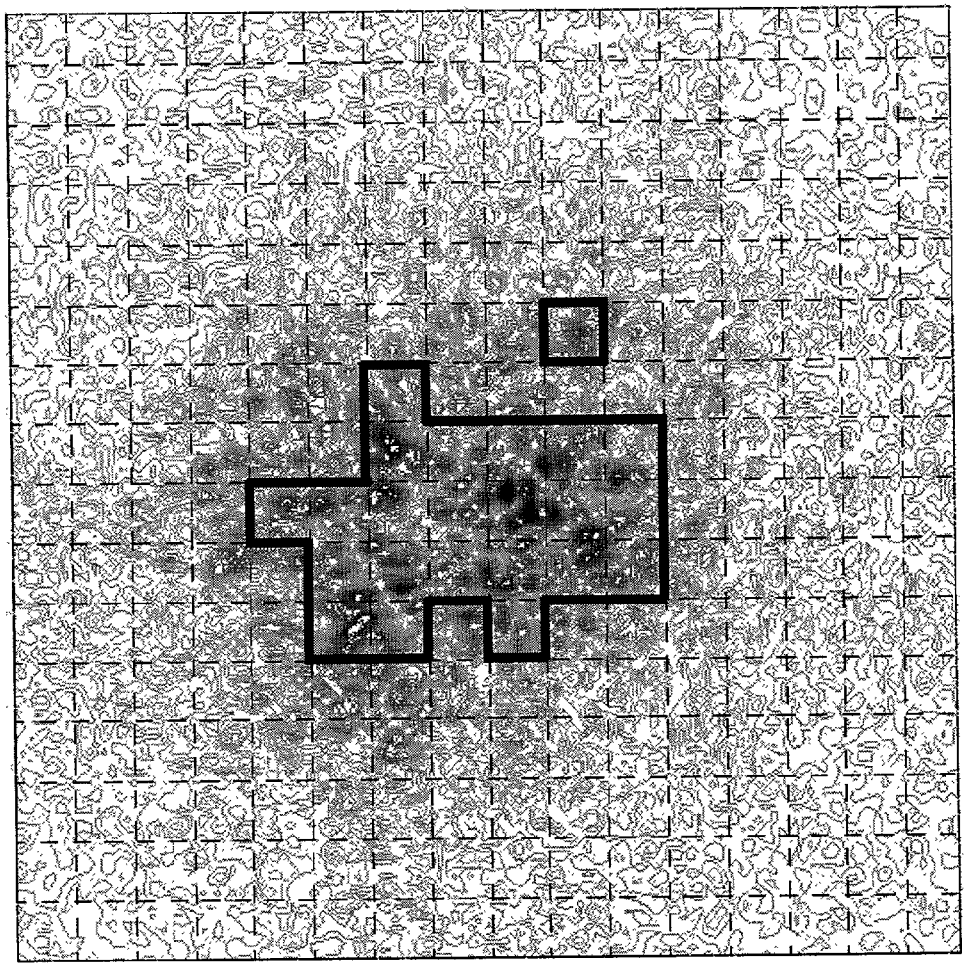
FIG. 4 is a representation of a receiver's point spread function overlaid with a signal mask by a signal-processing assembly according to the present invention.

However, it should be understood that the above system requires intensive calculations. Accordingly, in one alternative embodiment, the logarithmic weights are partitioned into two classes: large weights are assigned a value of "1" and small weights are assigned a value "0." Effectively, such a signal-processing method creates a "signal mask" that groups a set of the highest ranked detector elements together into a synthesized single detector as shown schematically in FIG. 4. In turn this synthesized detector changes with the changing channel.

Although only a binary approximation has been discussed above, any other suitable approximation could be applied to the logarithmic rates. For example, the computation of log(1+x) could be replaced by the computation of "x" in some cases, namely when the signal-to-noise ratio over each detector element is small.

Because computing the error probability for each increasing subarray requires a great deal of computation time, particularly when large detector arrays are used, in an alternative embodiment of the invention, the calculation takes into account the number of detectors and the total average signal and background energies. Utilizing such a method three different computations analogous to signal-to-noise ratios (SNR) were created according to:

$$SNR_1(l) = \frac{\left(\sum_{i=1}^{l} \lambda_{s,mn}\tau\right)^2}{l\lambda_b\tau} \quad (7)$$

$$SNR_2(l) = \frac{\left(\sum_{i=1}^{l} \lambda_{s,mn}\tau\right)^2}{l\lambda_b\tau + \sum_{i=1}^{l} \lambda_{s,mn}\tau} \quad \text{and} \quad (8)$$

$$SNR_3(l) = \sqrt{\frac{4\sum_{i=1}^{l} \lambda_{s,mn}\tau}{2l\lambda_b\tau + 1}} \quad (9)$$

where the index l represents the number of detector elements over which these functions are maximized, $1 \leq l \leq 256$ for the current example.

Although the above signal processing method and apparatus may be utilized with any intensity modulation technique, such as for example, binary PPM and on-off keying, in an exemplary embodiment the technique will be modeled on a M-ary PPM technique.

In M-ary PPM modulation, a signal pulse of duration τ sec is transmitted in one of M consecutive time slots, resulting in a PPM symbol of duration T=τM sec. Under the hypothesis that the signal pulse is contained in the ith time slot, the signal intensity is given by:

$$\lambda^{(i)}(t) = \begin{cases} \lambda_s(t): & (i-1)\tau \leq t \leq i\tau \\ 0: & \text{else} \end{cases} \quad (10)$$

As before, after propagating through the atmosphere and through the receiving optics, this temporal intensity function is transformed into a space-time intensity function in the detector plane. The integrated intensity over the mnth detector according to Equation 3 can then be designated as $\lambda^{(i)}_{mn}(t)$ in order to incorporate the hypothesis dependence. Where the integrated intensity can be written as:

$$\lambda^{(i)}_{mn}(t) = \begin{cases} \lambda_{s,mn}(t) + \lambda_b: & (i-1)\tau \leq t \leq i\tau \\ \lambda_b: & \text{else} \end{cases} \quad (11)$$

In this exemplary embodiment, it is assumed that each of the M messages is equally likely to be transmitted with probability $M^{-1}$, and that each message generates a unique vector of detector array intensities at the receiver, denoted by $\lambda^{(i)}(t) = (\lambda^{(i)}_{11}(t), \lambda^{(i)}_{12}(t), \ldots, \lambda^{(i)}_{KL}(t))$. As before, at the end of T sec, the signal-processing assembly computes the probability of having received the observed array of count accumulator functions and selects the message corresponding to the greatest probability of having been received. Equivalently, the decoder selects the message corresponding to the greatest log-likelihood function, $\Lambda_i(T)$, evaluated after T sec and conditioned upon the signal occurring at the ith time-slot:

$$\Lambda_i(T) = \ln\{p[N(t)|\lambda^{(i)}(t); 0 \le t < T]\} \quad (12)$$

$$= \sum_{m=1}^{K}\sum_{n=1}^{L} \ln\{p[N_{mn}(t)|\lambda^{(i)}_{mn}(t); 0 \le t < T]\}$$

$$= \sum_{m=1}^{K}\sum_{n=1}^{L}\left(-\int_{(i-1)\tau}^{i\tau}\lambda^{(i)}_{mn}(t)\partial t + \sum_{w_{j,mn}\in((i-1)\tau, i\tau)} \ln\lambda^{(i)}_{mn}(w_{j,mn}) + \right.$$

(terms that depend only on $\lambda_b$)

where $w_{j,mn}$ is the occurrence time of the jth photon over the mnth detector element within the same time slot.

Assuming constant signal intensity over the ith slot, independent of the value i, and ignoring the terms that depend only on $\lambda_b$ (which hence do not convey any information about the transmission), the log-likelihood function reduces to:

$$\Lambda_i(T) = \sum_{m=1}^{K}\sum_{n=1}^{L} \ln\left(1 + \frac{\lambda_{s,mn}}{\lambda_b}\right)N^{(i)}_{mn} \quad (13)$$

where $N^{(i)}_{mn}$ is defined as the total number of photons occurring over the mnth detector element during the ith time slot. Note that in this exemplary embodiment, with constant signal intensities the actual arrival times of photons within each time slot do not contribute to the decision; hence, only the total number of detected photons, $N^{(i)}_{mn}$, matters. Given that the intensity over each detector element is known, the ith log-likelihood function consists of the sum of a logarithmic function of the ratio of signal and background intensities from all detector elements over the ith pulse interval, multiplied by the total number of detected photons; the optimum detection strategy is then to select the symbol corresponding to the greatest log-likelihood function.

In such an M-ary PPM system, two distinct cases arise, when signal is present and when signal is not present. When signal is present then the intensity over the mnth element of the detector array is equal to the sum of the signal intensity $\lambda_{mn}$ and the background intensity $\lambda_b$, whereas when signal is not present the intensity over each detector element is simply equal to the background $\lambda_b$.

In such a M-ary PPM system, the received information is processed and decoded correctly if the weighted sum for the signal slot (q) exceeds the weighted sum for every other, i.e., non-signal slot, such that:

$$\Lambda_q(T) > \Lambda_i(T) \quad (14)$$

However, since the weights for each log-likelihood function are the same, it is possible that the maximum sum of weights occurs over two or more times, one of which is the true signal time, creating a "tie." In the case of a "tie" for the largest weighted sum in such a system, random choice is utilized among the largest likelihood functions: if there are r nonsignal slots tied for biggest with the correct signal slot, then the probability of selecting the correct symbol in the presence of (r+1) ties for biggest is $(r+1)^{-1}$. However, there are, (M−1) taken r at a time, ways these ties can occur among M slots. On the other hand, if none of the detectors registers a photon over any of the M slots, then we have to make a random choice among M possibilities, which yields a correct decision with probability $M^{-1}$. Assuming equiprobable signals, the probability of correctly decoding the received signal is denoted in Equation 15, below.

$$P_M(C) = P_M(C|H_q) = \left\{\sum_{r=0}^{M-1}\left(\frac{1}{r+1}\right)\binom{M-1}{r}\right. \quad (15)$$

$$\left.\sum_{k=1}^{\infty} p_q(\alpha_k|H_q)\left[p_i(\alpha_k|H_q)\right]^r\left[\sum_{\substack{j=0 \\ i\ne q}}^{k-1} p_i(\alpha_j|H_q)\right]^{M-1-r}\right\} +$$

$$M^{-1}\{p_q(\alpha_0|H_q)[p_i(\alpha_0|H_q)]^{M-1}\}$$

where $p_q$ and $p_i$, $i \ne q$, refer to the probability densities corresponding to the signal and non-signal hypotheses, respectively.

Alternatively, counting all "ties" as errors yields a tight lower bound on the probability of correct detection, and yields an easier to calculate probability function:

$$P_M(C) \ge P_M^1(C) \equiv \sum_{k=1}^{\infty} p_q(\alpha_k|H_q)\left[\sum_{\substack{j=0 \\ i\ne q}}^{k-1} p_i(\alpha_j|H_q)\right]^{M-1} + \quad (16)$$

$$M^{-1}\{p_q(\alpha_0|H_q)[p_i(\alpha_0|H_q)]^{M-1}\}$$

In turn this lower bound on the probability of correct detection yield the following upper bound on the error probability, which may be utilized to evaluate a variety of proposed detector array schemes:

$$P_u^M(E) = 1 - P_1^M(C) \ge P_M(E) \quad (17)$$

Although the above analysis has assumed an optimal detector regime, such a M-ary PPM system might also use a suboptimal or adaptive synthesized single detector, as described above. In such an embodiment, the probability of correct detection can be obtained directly from Equation 15, by setting $\alpha_k = k$ in the probability densities and assuming constant signal and background intensities over each time slot, yielding:

$$p_q(k|H_q) = \frac{(\lambda_s\tau + \lambda_b\tau)^k}{k!}e^{-(\lambda_s\tau + \lambda_b\tau)} \quad (18)$$

and

-continued $$p_i(k \mid H_q) = \frac{(\lambda_b \tau)^k}{k!} e^{-\lambda_b \tau} \quad (19)$$

Direct substitution of these Poisson densities into Equation 15 yields a probability of correct detection according to:

$$P_M(C) = \left\{ \sum_{r=0}^{M-1} \left(\frac{1}{r+1}\right)\binom{M-1}{r} \sum_{k=1}^{\infty} \frac{(\lambda_s \tau + \lambda_b \tau)^k}{k!} \right. \quad (20)$$

$$\left. e^{-(\lambda_s \tau + \lambda_b \tau)} \left[\frac{(\lambda_b \tau)^k}{k!} e^{-\lambda_b \tau}\right]^r \left[\sum_{j=0}^{k-1} \frac{(\lambda_b \tau)^j}{j!} e^{-\lambda_b \tau}\right]^{M-1-r} \right\} +$$

$$M^{-1} e^{-(\lambda_s + M \lambda_b)\tau}$$

However, when the array contains a large number of detector elements, the computation of the probability density of the weighted sum of Poisson random variables by the signal processing assembly may become prohibitive. In such a case, an alternative approximating signal processing method may be utilized to substitute the true discrete density with a simpler continuous density. For example, in one alternative exemplary embodiment, a Gaussian approximation to the discrete density of the weighted sum of Poisson random variables is derived from the characteristic function of the discrete density.

The various signal processing techniques detailed above were modeled utilizing an exemplary M-ary pulse-position modulation (PPM) data transmission protocol. In this protocol one of M intensity functions is received by the receiver 10 and the receiver attempts to determine the correct symbol based on observations of the array of count accumulator functions over each of M time slots. It is assumed for the purpose of this exemplary embodiment that the symbol boundaries are known and that the arrival time of each detected photon and total number of detected photons can be stored for a limited duration of time necessary for processing by the signal-processing assembly 24.

First, a comparison of the performance of signal-processing assemblies utilizing the optimally weighted array receiver and the adaptive synthesized single-detector signal-processing methods described above, were carried out for two model receivers exposed to average background energies of $K_b \equiv \lambda_b \tau = 0.1$ and 1.0.

Two different signal models were used: 1) a simple test model wherein only 5 of the 16×16=256 total detector elements were assumed to contain signal energy while the rest were assumed to contain no signal; and 2) a more realistic 16×16 detector array model wherein the signal distribution over the array was simulated using a Kolmogorov turbulence model in which all 256 detector elements potentially contained some signal.

Figure 5:
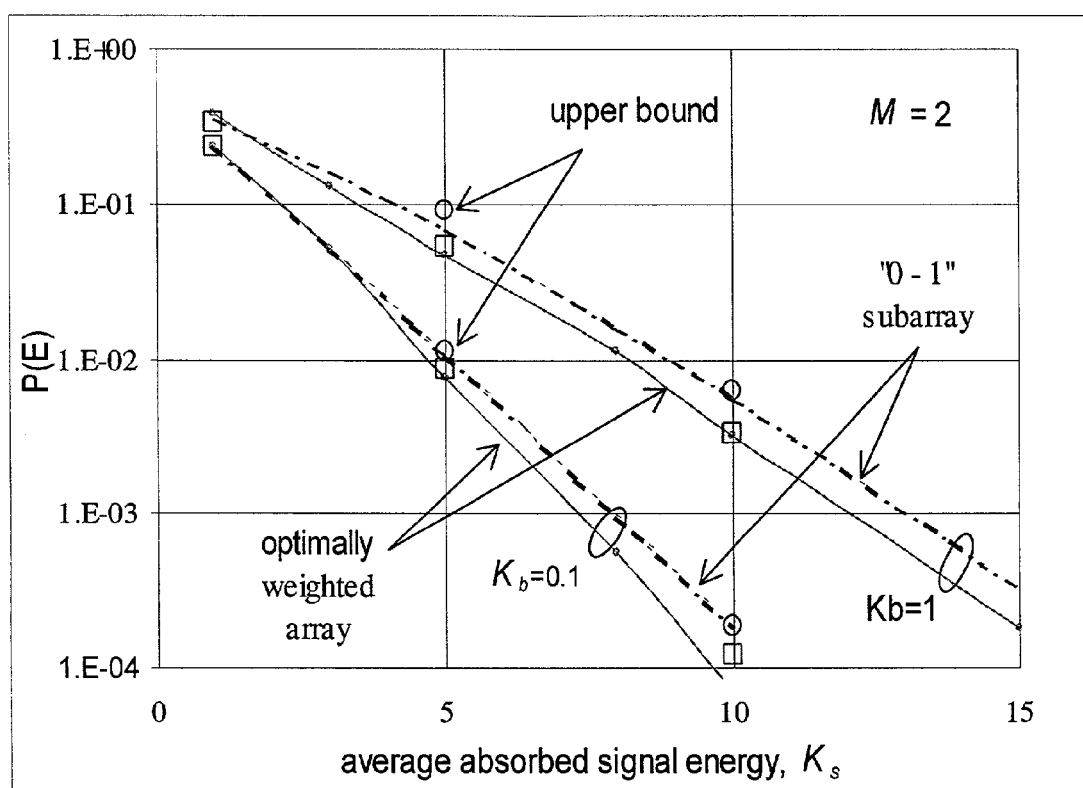
FIG. 5 is a graphical representation of the performance of an optical receiver according to the present invention in terms of average number of received photons.

For the test model, the proportions of the total average absorbed signal energy, $K_s \equiv \lambda_s \tau$, over the five detector elements were assumed to be (1.0, 0.3, 0.2, 0.05, 0.02). The optimally weighted array receiver (Equation 16) and the synthesized single-detector receiver (Equation 20) signal processing methods were then evaluated with this model and compared with results obtained via Monte Carlo simulations. The results are shown in FIG. 5, as a function of the total average absorbed signal energy, $K_s$. From this plot, it is evident that optimal weighting yields somewhat better performance than the suboptimum single-synthesized or signal mask array, and that greater improvements occur at greater background intensities. However, the improvements due to the more complicated signal-processing utilized in the optimally weighted array are only about 0.3 dB at an error probability of 0.001 for the high background case.

Figure 6:
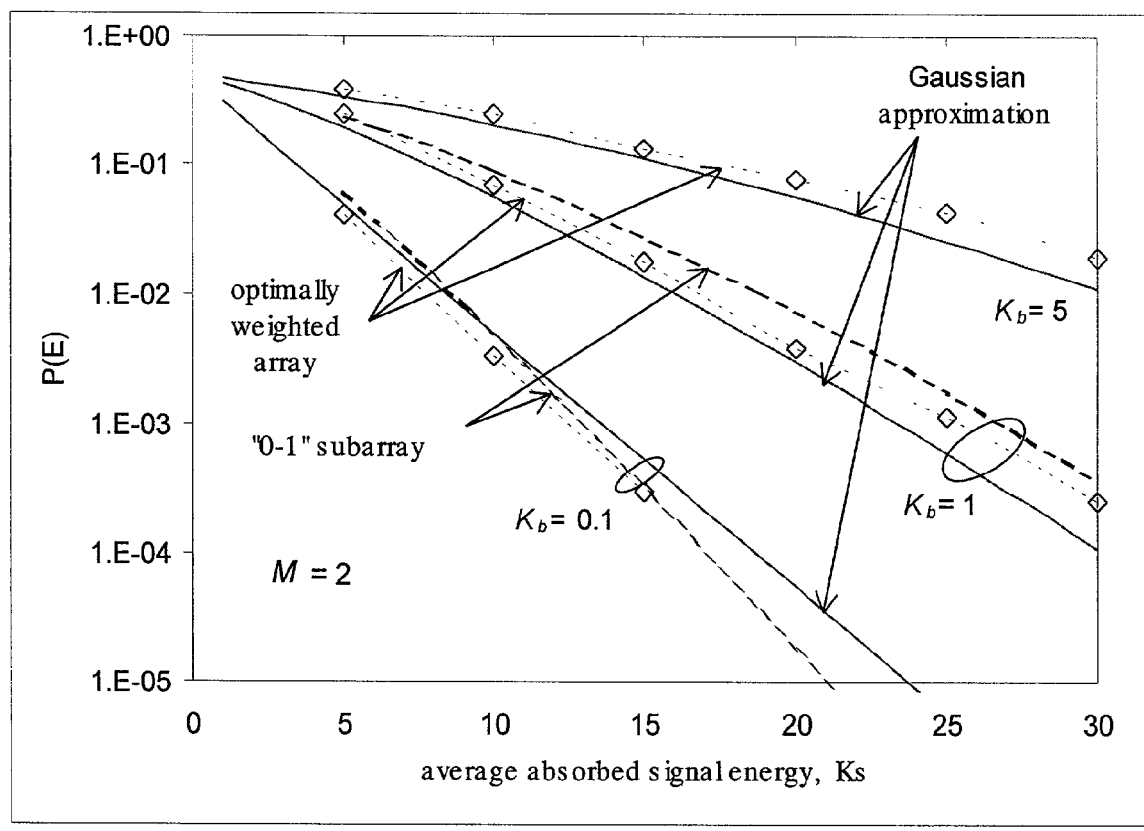
FIG. 6 is a graphical representation of the performance of an optical receiver according to the present invention in terms of average number of received photons.

In FIG. 6, a realistic spatial distribution of the signal intensity over the focal plane was generated using Kolmogorov phase screens. Monte Carlo simulations were performed to evaluate the error probability for the optimally weighted array. The Gaussian approximation to the error probability defined by:

$$\eta = \sum_{m=1}^{K} \sum_{n=1}^{L} \mu_{mn} \lambda_{mn} \tau \quad (21)$$

and $$\sigma^2 = \sum_{m=1}^{K} \sum_{n=1}^{L} \mu_{mn}^2 \lambda_{mn} \tau \quad (22)$$

was also evaluated for the binary PPM case, M=2, with average background energies (per detector element) of $K_b \equiv \lambda_b \tau = 0.1$, 1.0 and 5.0 photons/time slot, as a function of the total average signal energy.

From this plot, it can be seen that the Gaussian approximation is close to the exact values obtained from Monte Carlo simulation and that good agreement is obtained even for small background energies per detector element, as direct comparison with the simulation results indicates. In fact, the Gaussian approximation embodiment provides useful results over the entire range of background and signal energies represented in FIG. 6. The performance of the synthesized signal masked process is also shown; it can be seen that its performance is well within tolerable limits.

Figure 7A:
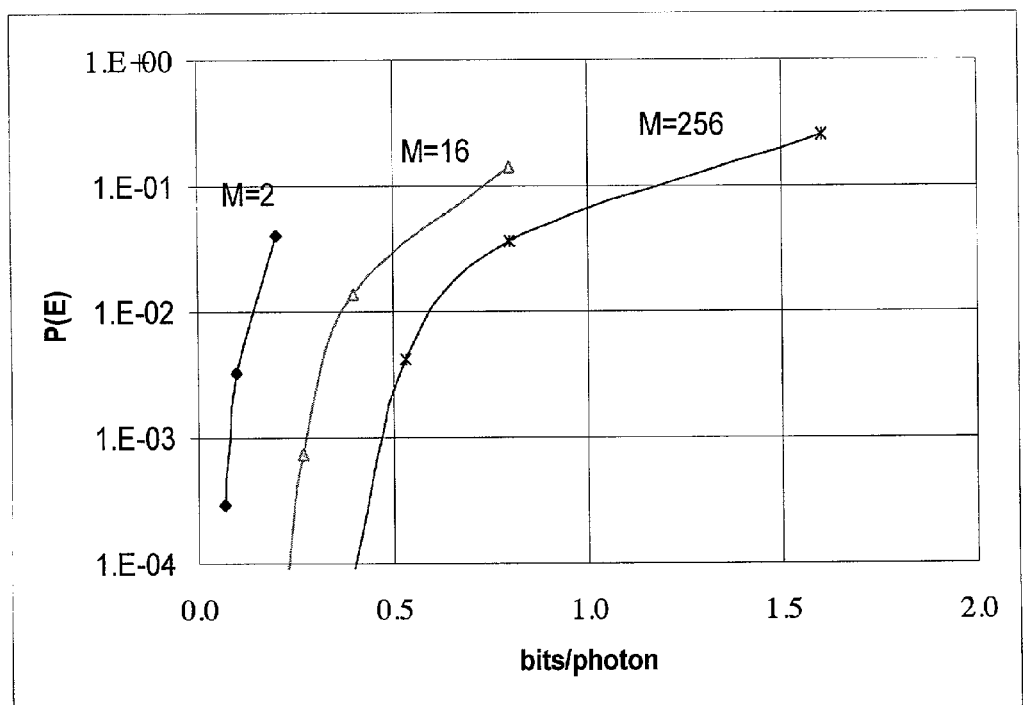
FIG. 7a is a graphical representation of the performance of an optical receiver according to the present invention in terms of photon efficiency.
Figure 7B:
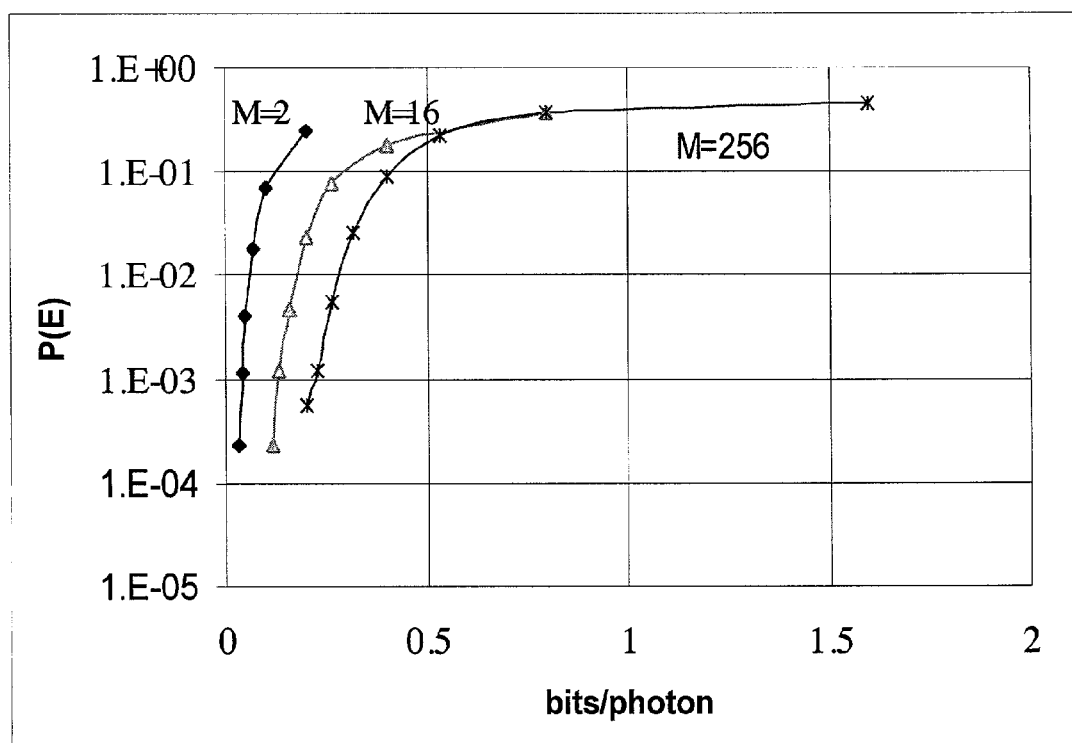
FIG. 7b is a graphical representation of the performance of an optical receiver according to the present invention in terms of photon efficiency.

Both analytical calculations and Monte Carlo simulations were performed in order to obtain PPM error probabilities for the receiver according to the invention. Performance of the optimally weighted array receiver embodiment was obtained from simulations; for each PPM symbol, M Poisson random variables with the proper statistics were generated, the optimum weights were applied, and the symbol corresponding to the largest observable selected. Simulated turbulence-degraded signal distributions were then generated over the 16×16 detector array for all subsequent results. With no loss in generality, the transmitted symbol was always assumed to be the one corresponding to a signal pulse in the first slot. The detector process was repeated a large number of times (until 100 errors were accumulated) and repeated for increasing average signal energy with various background levels. The results of this test are shown in FIGS. 7a and 7b for M=2, 16 and 256. The probability of bit error is shown as a function of the receiver's photon efficiency, ρ, which is a measure of the average number of bits of information carried by each photon. It can be seen from the plot that, with background levels from 0.1 to 1.0 photons per slot, ρ from 0.3 to 0.5 bits/photon can be achieved with 256 PPM signaling at uncoded symbol-error probabilities of around 0.001 to 0.01.

In order to generate a spatial distribution of the signal incident upon the detector plane, a sample field was generated using a Kolmogorov phase-screen program, resulting in a matrix of complex signal amplitudes. For the simulations, an atmospheric correlation length of $r_0$=4 cm was assumed, which implies that the results should apply to any receiving aperture that is much greater than this correlation length. The field intensity generated in the detector plane by the simulation then was integrated over the elements of a 16×16 detector array, which was assumed to encompass the extent of the signal distribution in the detector plane. The detector signal intensities are normalized so that for the mnth detector an average number of absorbed signal photon of $\lambda_{s,mn}\tau$ is obtained. A constant average background photon energy of $\lambda_b\tau$ is assumed over each detector element.

Figure 8:
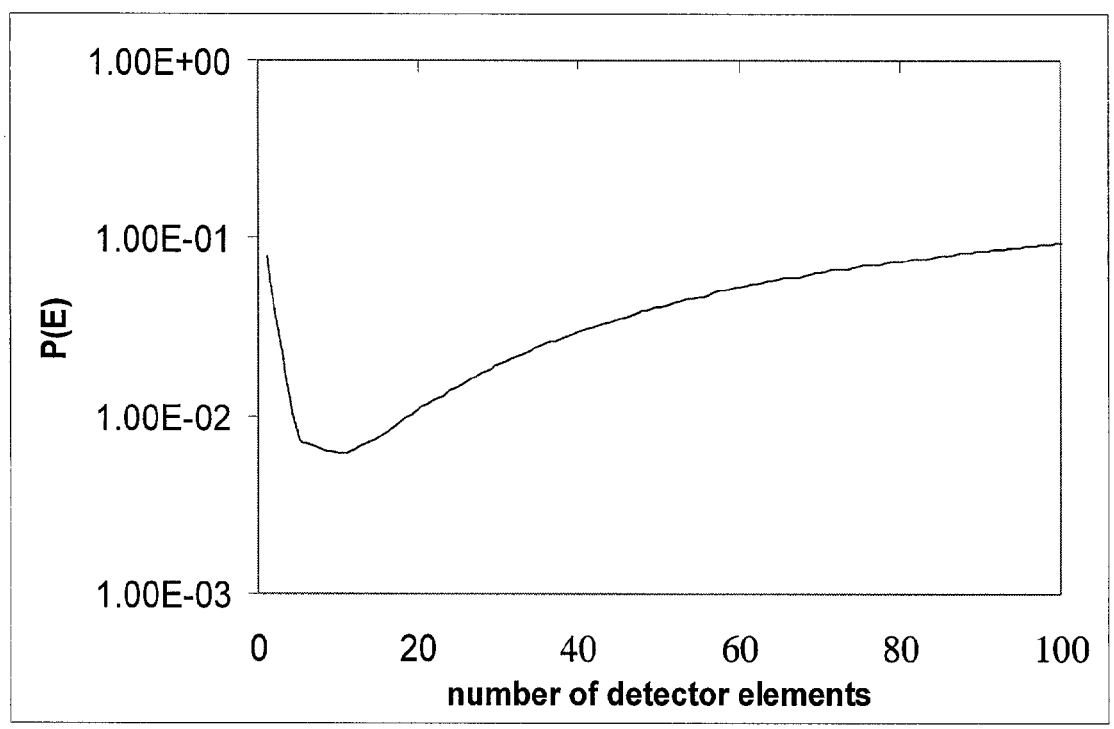
FIG. 8 is a graphical representation of the performance of an optical receiver according to the present invention in terms of number of ranked detector elements included.

For a given sample function of the intensity distribution, the 256 detector elements were sorted in decreasing order of average signal energy, and Mary PPM symbol-error probabilities were calculated for increasing numbers of detectors, starting with the first detector, using the synthesized single-detector signal processing embodiment of the current invention. FIG. 8 shows the symbol-error probability for binary PPM, M=2, as a function of the number of detector elements used for the case $K_s$=10 and $K_b$=0.1 (that is, the total average signal photons absorbed by the entire array is 10 and the average number of background photons per detector element is 0.1.) It can be seen from the plot that, for this case, the smallest error probability of 0.0049 is achieved by assigning unity weight to the first 11 detector elements containing the greatest signal intensities and zero to all the rest.

Figure 9A:
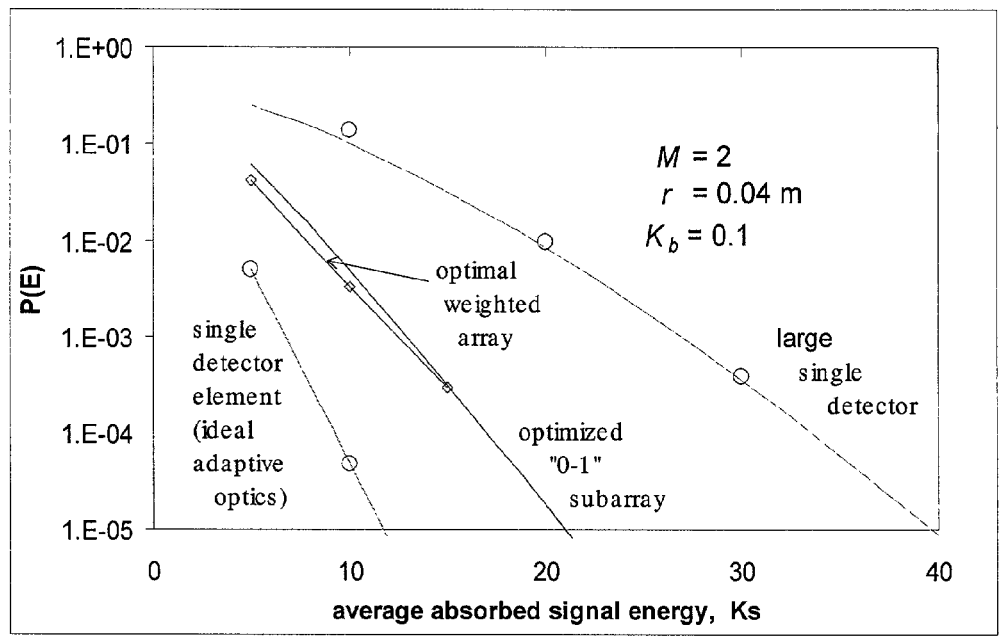
FIG. 9a is a graphical representation of the performance of an optical receiver according to the present invention with various PPM dimensions, and background noise levels.
Figure 9B:
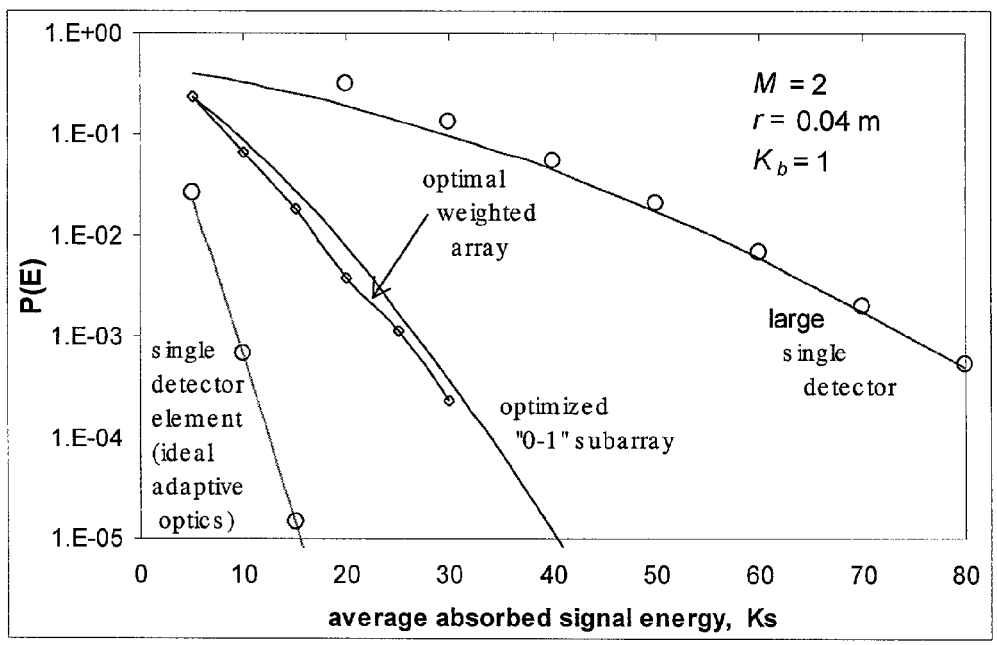
FIG. 9b is a graphical representation of the performance of an optical receiver according to the present invention with various PPM dimensions, and background noise levels.

In FIGS. 9a and 9b, binary PPM symbol-error probabilities are shown as a function of total average number of absorbed signal photons for four cases: 1) when the optimum number of unweighted detector elements is used, 2) when the optimally weighted array is simulated, 3) when all 256 detector elements are given unity weight (synthesizing a large, nonadaptive single-detector element), and 4) when an ideal adaptive optics system succeeds in concentrating all of the available signal energy into a single detector element, which then is the only detector element that is observed.

Using the same focal-plane signal distribution as before, error probabilities were computed for average background photon counts of 0.1 and 1.0, shown in FIGS. 9a and 9b, indicating performance gains by the adaptive detector array receiver according to the current invention over a single large nonadaptive detector of 2 and 2.8, respectively, at an error probability of 0.001, corresponding to 3 and 4.5 dB of performance improvement. Meanwhile, when compared with the ideal adaptive optics receiver that concentrates all of the collected signal energy in a single element of the array, the gains are 3.8 and 8.2, corresponding to 5.9 and 9.1 dB of improvement. However, between the optimally weighted array embodiment and the synthesized single detector or signal mask embodiment of the current invention, there is only a 0.3 dB improvement at a symbol error probability of 0.001, even with a relatively high background energy of $K_b$=1.0.

Figure 9C:
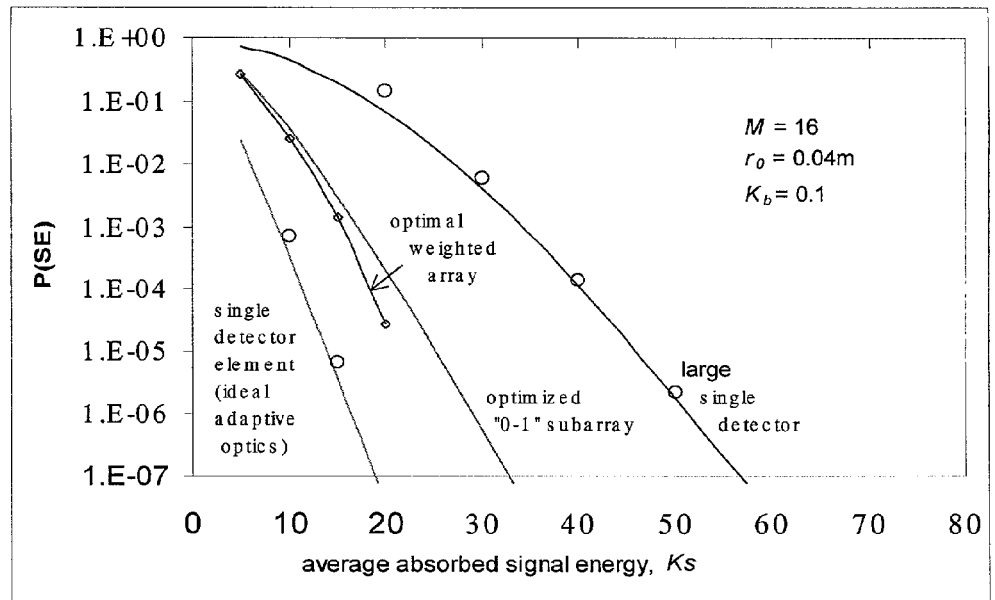
FIG. 9c is a graphical representation of the performance of an optical receiver according to the present invention with various PPM dimensions, and background noise levels.
Figure 9D:
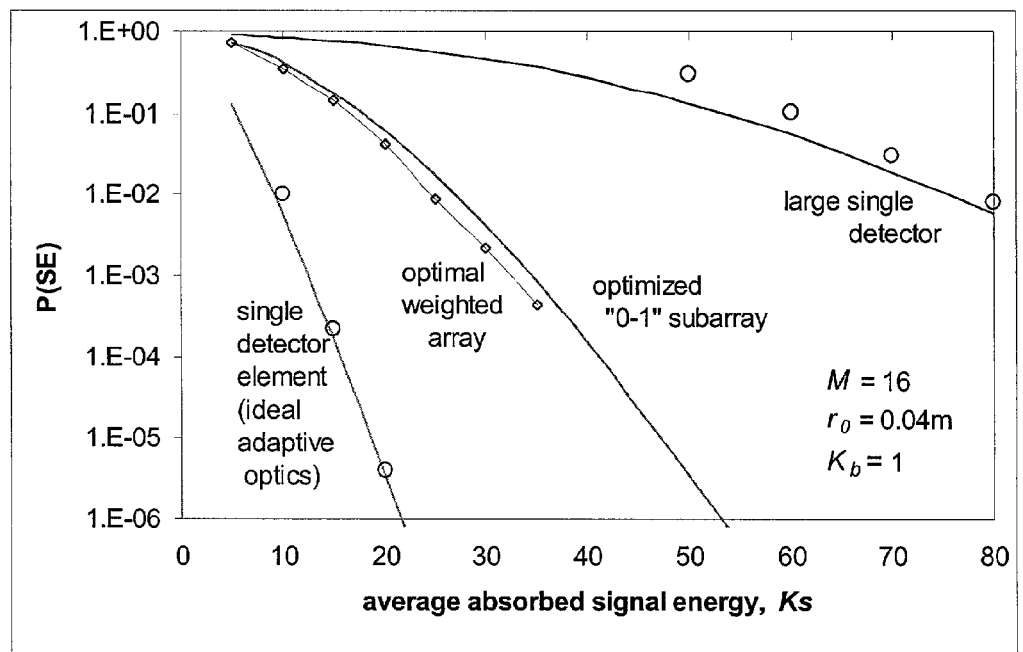
FIG. 9d is a graphical representation of the performance of an optical receiver according to the present invention with various PPM dimensions, and background noise levels.

Similar gains are evident in FIGS. 9c and 9d, which represent the symbol-error probability, P(SE), of the optimized subarray observing 16-dimensional (M=16) PPM. The accuracy of the union bound evaluated for the case $\lambda_b\tau>>1$ is evident, especially at the lower error probabilities.

Figure 10:
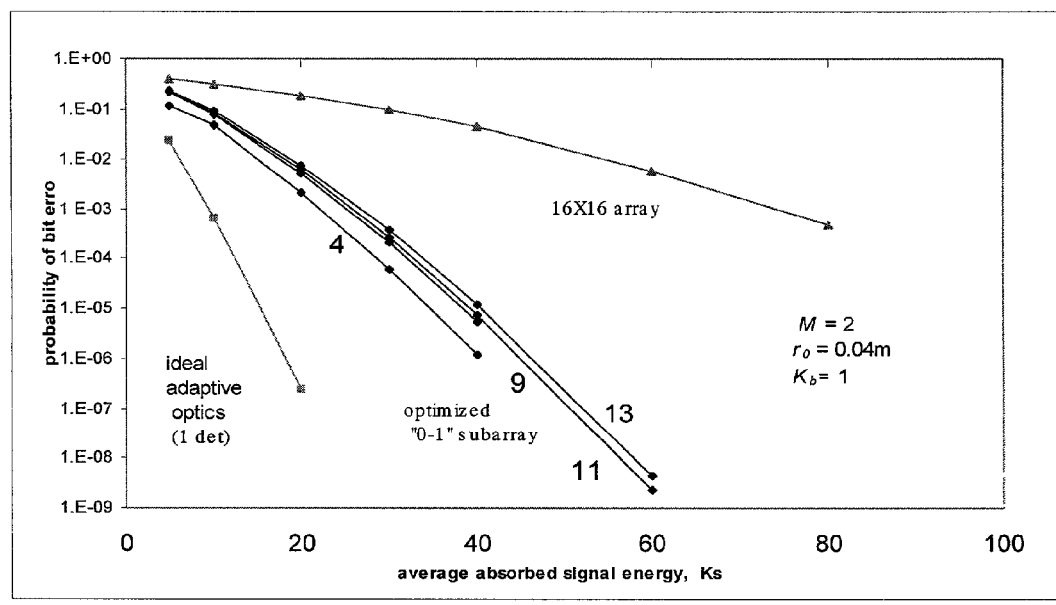
FIG. 10 is a graphical representation of the performance of an optical receiver according to the present invention for different realizations of the instantaneous point spread functions.

As shown in FIG. 10, performance improvements are also observed for several different focal-plane distributions at an average background energy of one photon per detector per slot to verify that the above results were typical. This plot shows that three out of four simulations yielded performance comparable to that shown in FIG. 9b, requiring approximately 26 signal photons to achieve an error probability of 0.001 while utilizing 9 to 13 elements of the array in the region of error probabilities examined. Accordingly, receiver performance is independent of array distribution under the same atmospheric and receiver parameters.

Figure 11:
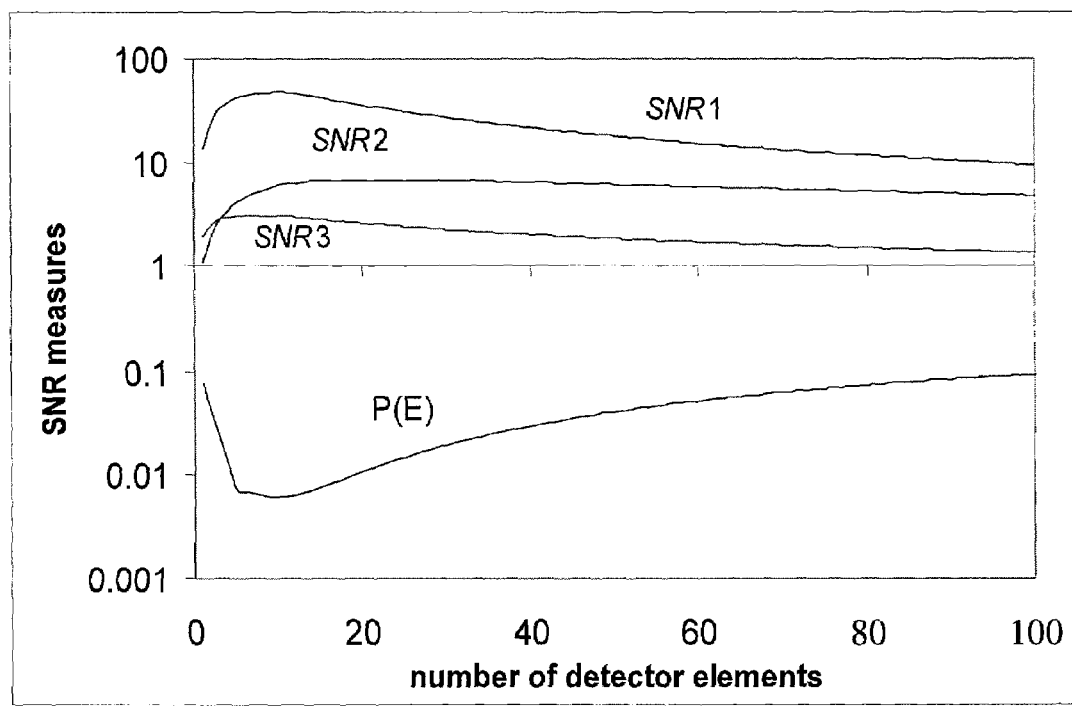

FIG. 11 shows the three functions versus l for the case $\lambda_s\tau$=10 and $\lambda_b\tau$=0.1, assuming Poisson statistics. As can be seen from the plot, the maximum values for these three measures are reached when l equals 10, 22, and 7 detector elements, resulting in binary PPM symbol-error probabilities or $5.978\times10^{-3}$, $5.84\times10^{-3}$, and $1.049\times10^{-2}$, respectively, as compared with the performance of the true optimum subarray of $4.884\times10^{-3}$ calculated from the actual error probabilities and achieved with 15 detector elements.

Figure 12:
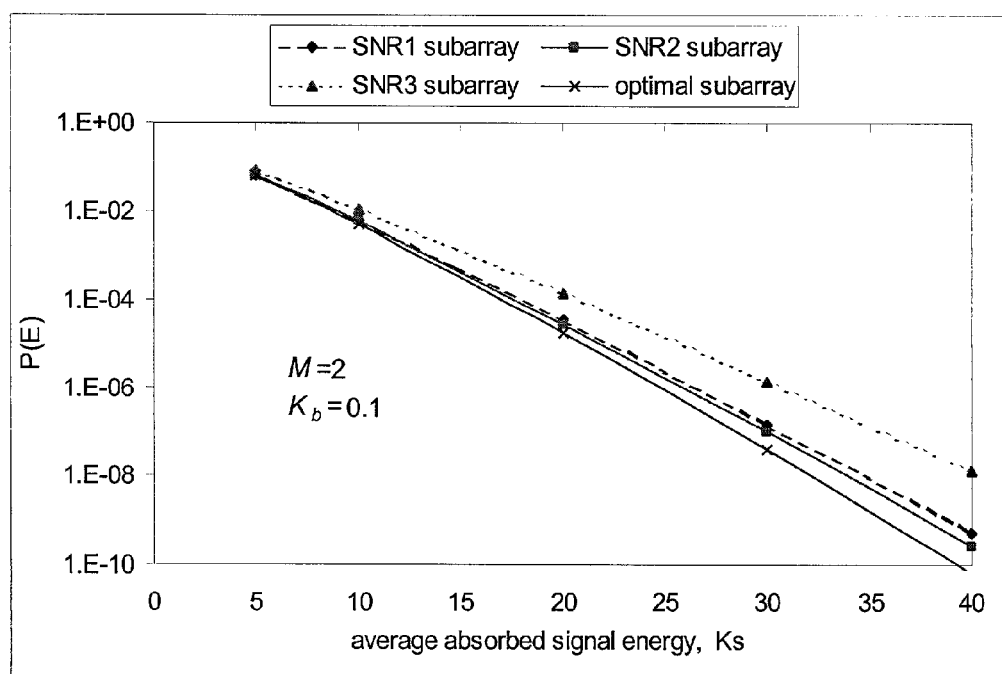
FIG. 12 is a graphical representation of the performance using different signal-to-noise ratio measures according to the present invention.

FIG. 12 in turn shows how subarrays obtained using the three different SNR measures given by Equations 7, 8 and 9, respectively, compare with the performance of the true optimized subarray over a range of signal energies for a particular signal distribution. As can be observed from the plot, both $SNR_1$ and $SNR_2$ yield performances comparable to that of the optimized subarray and, therefore, could be used to optimize the subarray dimensions in real time.

Finally, thus far the above evaluations of the performance of the receivers according to the present invention were obtained under the assumption that the true value of the average signal and background photons absorbed by each detector element are known. Accordingly, in these tests the sorting of the detector elements is based on the true signal energies. However, in many systems the signal energies will change with time due to turbulence. Therefore, the case when the signal energies were not known a priori, but had to be estimated was tested. The results of the simulations in which actual Poisson deviates were generated for each array element, and the mean signal energies estimated from the observed outputs, are presented in FIG. 13 for binary PPM.

For each detector array element, Poisson random variable were generated for the Mary signal and background slots with average intensities obtained from the Kolmogorov phase-screen output plus a specified level of background light. These deviates were generated for L PPM symbols and the slot outputs added for each detector element, resulting in m×n statistics according to:

$$Y_{mn} = \sum_{i=1}^{L} \sum_{j=0}^{M-1} X_{mn}(i,j) \tag{23}$$

where $X_{mn}(i,j)$ is the output of the jth slot of the ith PPM symbol. These statistics were sorted as before from largest to smallest. The average number of signal photons was estimated from these statistics as:

$$\lambda_{s,mn}\tau = \max\left(\frac{Y_{mn}}{L} - M\lambda_b\tau, 0\right) \tag{24}$$

where it is assumed in this exemplary embodiment that the actual background intensity can be estimated accurately, both because it is essentially constant and because typically there is significant dead time between PPM symbols to allow for transmitter laser recovery, which can be used to estimate the background intensity accurately since no signal photon are present. During operation once the average signal and background energies have been estimated, $SNR_1(l)$ may again be maximized over the number of elements, l, as before in order to obtain the optimum detector subarray.

Figure 13:
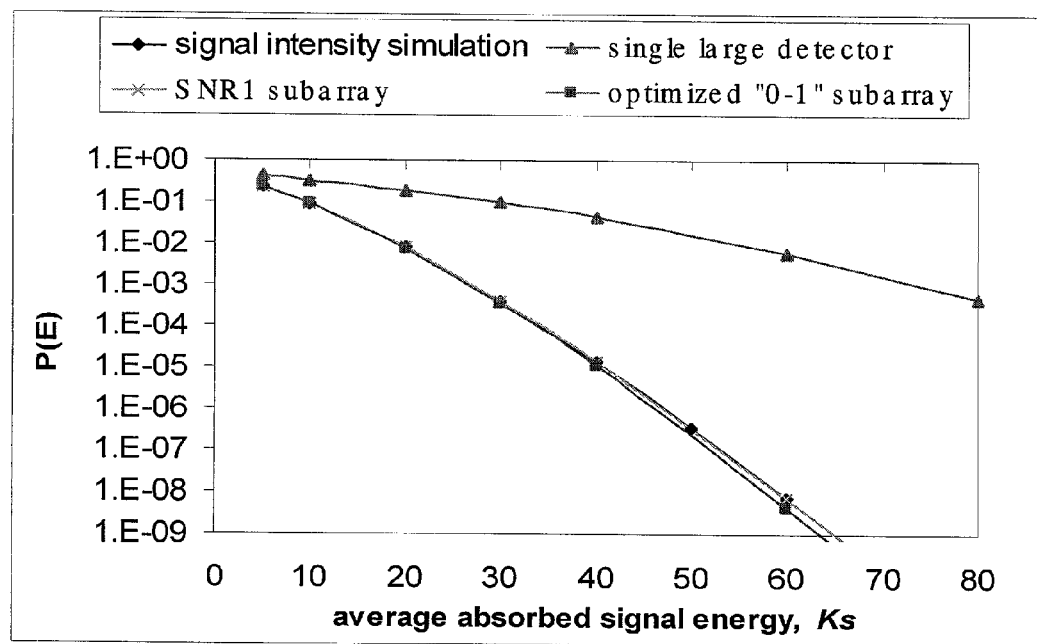
FIG. 13 is a graphical representation of the effect of real-time signal-to-noise ratio estimations on the performance of an optical receiver according to the present invention.

Results for binary PPM with estimated signal energies are shown in FIG. 13 for an average background energy of 1.0 photon per detector element per slot. This Figure shows the symbol-error probability as a function of total average absorbed signal energy, $K_s$, using estimates of the signal intensity obtained from the simulation with L=1000, as well as three other curves where exact knowledge of the input distribution was assumed; the 16×16 subarray, the optimized subarray based on the actual energy probabilities, and the subarray obtained by maximizing $SNR_1$. It should be noted that the simulation and $SNR_1$ subarray curves are indistinguishable in both cases, indicating that estimation of the signal energies over the array does not result in any appreciable performance degradation. It also is evident that subarray optimization based on the simple $SNR_1$ algorithm results in only slight losses, but succeeds in greatly reducing the complexity of the estimator; for $K_b$=1.0, the loss is less than 0.15 dB over the entire range considered in FIG. 13.

The elements of the apparatus and method and the general features of the components are shown and described in relatively simplified and generally symbolic manner. Appropriate structural details and parameters for actual operation are available and known to those skilled in the art with respect to the conventional aspects of the process.

Although specific embodiments are disclosed herein, it is expected that persons skilled in the art can and will design alternative adaptive optical receivers that are within the scope of the following claims either literally or under the Doctrine of Equivalents.

What is claimed is:

1. An optical communications receiver for receiving and processing turbulence degraded optical signals comprising:
   a detector array comprising a grid array of N×M detector elements, where N is ≧2 and M is ≧2 for detecting a point spread function characteristic of the received optical signal, wherein each of the plurality of detector elements outputs a detector output characteristic of a portion of the point spread function;
   a signal processor for real-time processing the detector outputs to optimize the performance of the optical communications receiver by separating a plurality of performance enhancing detected signals from a plurality of performance degrading detected signals, the signal processor being further configured to:
   receive the detector outputs from the plurality of detector elements and estimate a signal intensity from each detector output,
   select the performance enhancing detector outputs by selecting the detector outputs containing sufficient signal intensity to improve the performance of the optical detector, and
   combine the performance enhancing detector outputs into a single processed signal characteristic of the instantaneous point spread function; and
   a decoder for detecting the received optical signal in the processed signal and outputting a decoded optically transmitted symbol to a user.

2. An optical receiver as described in claim 1 further comprising a collecting aperture for collecting the transmitted signals from an external source.

3. An optical receiver as described in claim 1 further comprising focusing optics for focusing the received signals onto the detector.

4. An optical receiver as described in claim 1 wherein the detector comprises a grid array of N×M detector elements, where N is ≧4 and M is ≧4.

5. An optical receiver as described in claim 1 wherein the detector elements are selected from the group consisting of: photomultiplier, avalanche photodiodes and PIN diodes.

6. An optical receiver as described in claim 1 wherein the signal processor operates on the received optical signal at a rate equal to or greater than the Nyquist rate.

7. An optical receiver as described in claim 1 wherein the signal processor processes the received optical signal by weighting the detector outputs based on a function of a characteristic signal to noise ratio wherein the function is either a logarithmic function or an approximation of a logarithmic function.

8. An optical receiver as described in claim 1 wherein the signal processor processes the received optical signal by ranking the detector outputs and utilizing only those detector outputs with the greatest signal content.

9. An optical receiver as described in claim 1 wherein the received optical signal Is transmitted in an intensity modulated transmission protocol.

10. An optical receiver as described in claim 1 wherein the received optical signal is transmitted in a protocol selected from the group consisting of: binary pulse-position modulation, M-ary pulse-position modulation and on-oft key modulation.

11. A method for optimizing an optical communications receiver by eliminating atmospheric turbulence degradation of signals comprising:
    detecting an incoming optical signal with a grid array of N×M detector elements, where N is ≧2 and M is ≧2, such that each detector element outputs a detector output; and
    processing said detector outputs in real time at a rate equal to or greater than the Nyquist rate of the detected signal, wherein the step of processing further comprises:
    estimating the signal intensity of each of the detector outputs;
    analyzing the detector outputs to determine which detected signals have sufficient signal intensity to improve the performance of the optical communications receiver;
    selecting those performance enhancing detector outputs;
    combining the performance enhancing detector outputs into a single processed signal; and
    decoding the processed signal to determine the data content of the incoming optical signal.

12. A method as described in claim 11 wherein the step of analyzing comprises calculating weighted log-likelihood functions for each detector output and comparing the weighted log-likelihood functions for each detector output to determine the greatest log-likelihood function.

13. A method as described in claim 11 wherein the step of analyzing comprises ranking the detector outputs based on their signal intensity, and wherein the step of comparing comprises computing the probability error for each successive set of detector elements plus a measured background noise for each of the detector elements.

14. A method as described in claim 11 wherein the step of analyzing comprises ranking the detector outputs based on their signal intensity, and wherein the step of comparing comprises assigning a weighting value of 1 to those detector outputs above a specified threshold of received optical signal and assigning a weighting value of 0 to those outputs below the specified threshold to create an effective signal mask.

15. A method as described in claim 11 wherein the step of analyzing comprises ranking the detector outputs based on their signal intensity, and wherein the step of comparing comprises assigning a weighting value to each of the detector outputs according to an approximation of a logarithmic rate for each of the detector outputs.

16. A method as described in claim 11 wherein the step of comparing comprises calculating a signal-to-noise ratio measure for each detector output and assigning a weighting value to the outputs based on those ratios.

17. The optical communications receiver of claim 1, wherein the detector array is a wide-band communications detector array, and the signal processor is configured to optimize a bit error rate of the optical communications receiver.

* * * * *

UNITED STATES PATENT AND TRADEMARK OFFICE
CERTIFICATE OF CORRECTION

PATENT NO. : 7,058,316 B2  Page 1 of 1
APPLICATION NO. : 09/996233
DATED : June 6, 2006
INVENTOR(S) : Vilnrotter et al.

It is certified that error appears in the above-identified patent and that said Letters Patent is hereby corrected as shown below:

On the Title Page

Item (56) References Cited    Delete "Poinat",
Other Publications            Insert --Point--
Snyder, D.L. "Random. . .

In the Claims

Column 15, line 67, Claim 5    Delete "photomultiplier",
                               Insert --photomultipliers--

Column 16, line 15, Claim 9    Delete "Is",
                               Insert --is--

Column 16, line 20, Claim 10   Delete "on-oft"
                               Insert --on-off--

Signed and Sealed this

Thirtieth Day of January, 2007

JON W. DUDAS
*Director of the United States Patent and Trademark Office*